(12) United States Patent
Szary et al.

(10) Patent No.: US 12,273,332 B2
(45) Date of Patent: Apr. 8, 2025

(54) SECONDARY AUTHENTICATION PLATFORM FOR FACILITATING A MULTI-FACTOR AUTHENTICATION AND METHODS FOR USE THEREWITH

(71) Applicant: Secfense Sp. z o.o., Cracow (PL)

(72) Inventors: Marcin Szary, Cracow (PL); Tomasz Kowalski, Cracow (PL)

(73) Assignee: Secfense Sp. z.o.o, Cracow (PL)

( * ) Notice: Subject to any disclaimer, the term of this patent is extended or adjusted under 35 U.S.C. 154(b) by 301 days.

(21) Appl. No.: 17/820,947

(22) Filed: Aug. 19, 2022

(65) Prior Publication Data

US 2023/0102434 A1   Mar. 30, 2023

Related U.S. Application Data

(60) Provisional application No. 63/261,851, filed on Sep. 30, 2021.

(51) Int. Cl.
*H04L 9/40* (2022.01)

(52) U.S. Cl.
CPC ............ *H04L 63/08* (2013.01); *H04L 63/102* (2013.01); *H04L 2463/082* (2013.01)

(58) Field of Classification Search
CPC ....... H04L 9/0838; H04L 63/02; H04L 63/08; H04L 63/102; H04L 63/107; H04L 63/0861; H04L 63/083; H04L 63/0876; H04L 63/0884; H04L 63/205; H04L 63/1433; H04L 9/3247; H04L 63/0823; H03M 13/3972; G06F 21/31; G06F 21/34; G06F 21/42
See application file for complete search history.

(56) References Cited

U.S. PATENT DOCUMENTS

| | | | |
|---|---|---|---|
| 2014/0250518 A1* | 9/2014 | Schneider ............... | G06F 21/34 726/9 |
| 2016/0087957 A1* | 3/2016 | Shah ..................... | H04L 63/205 726/1 |
| 2017/0118251 A1* | 4/2017 | Roth ..................... | H04L 63/083 |

(Continued)

*Primary Examiner* — Dustin Nguyen
(74) *Attorney, Agent, or Firm* — Garlick & Markison; Bruce E. Stuckman

(57) ABSTRACT

A secondary authentication platform operates by: probing an application server to imitate an authentication process associated with a first authentication factor; generating, via a learning function and in response to the probing, authentication pattern data associated with the first authentication factor; monitoring data transmissions from a client device that are directed to the application server; identifying authentication data associated with the first authentication factor in the data transmissions from the client device based on a comparison of the authentication data to the authentication pattern data; communicating with the client device via the network interface to authenticate a user of the client device to the secondary authentication platform via a second authentication factor; and when the user of the client device is authenticated to the secondary authentication platform via the second authentication factor, forwarding the authentication data to the application server to authenticate the user of the client device to the application server via the authentication process associated with the first authentication factor.

20 Claims, 19 Drawing Sheets

(56) References Cited

U.S. PATENT DOCUMENTS

| | | | |
|---|---|---|---|
| 2017/0126660 A1* | 5/2017 | Brannon | H04L 63/0823 |
| 2017/0346851 A1* | 11/2017 | Drake | H04L 9/0838 |
| 2018/0013782 A1* | 1/2018 | Choyi | H04L 63/1433 |
| 2018/0097787 A1* | 4/2018 | Murthy | H04L 63/08 |
| 2018/0097788 A1* | 4/2018 | Murthy | H04L 63/102 |
| 2018/0097840 A1* | 4/2018 | Murthy | H04L 63/02 |
| 2018/0205741 A1* | 7/2018 | Roussos | G06F 21/31 |
| 2018/0295137 A1* | 10/2018 | Zager | H04L 63/0861 |
| 2019/0044942 A1* | 2/2019 | Gordon | H03M 13/3972 |
| 2019/0207927 A1* | 7/2019 | Lakhani | G06F 21/42 |
| 2020/0396243 A1* | 12/2020 | Trentini | H04L 9/3247 |
| 2021/0194883 A1* | 6/2021 | Badhwar | H04L 63/107 |
| 2022/0158999 A1* | 5/2022 | Kaidi | H04L 63/0884 |
| 2022/0385656 A1* | 12/2022 | Gujarathi | H04L 63/0876 |

* cited by examiner

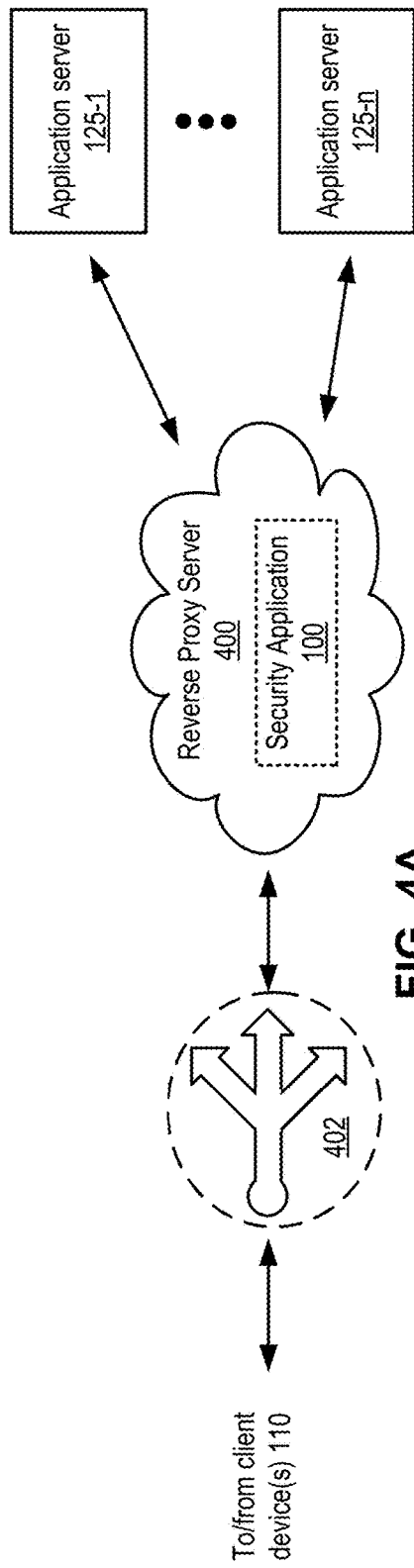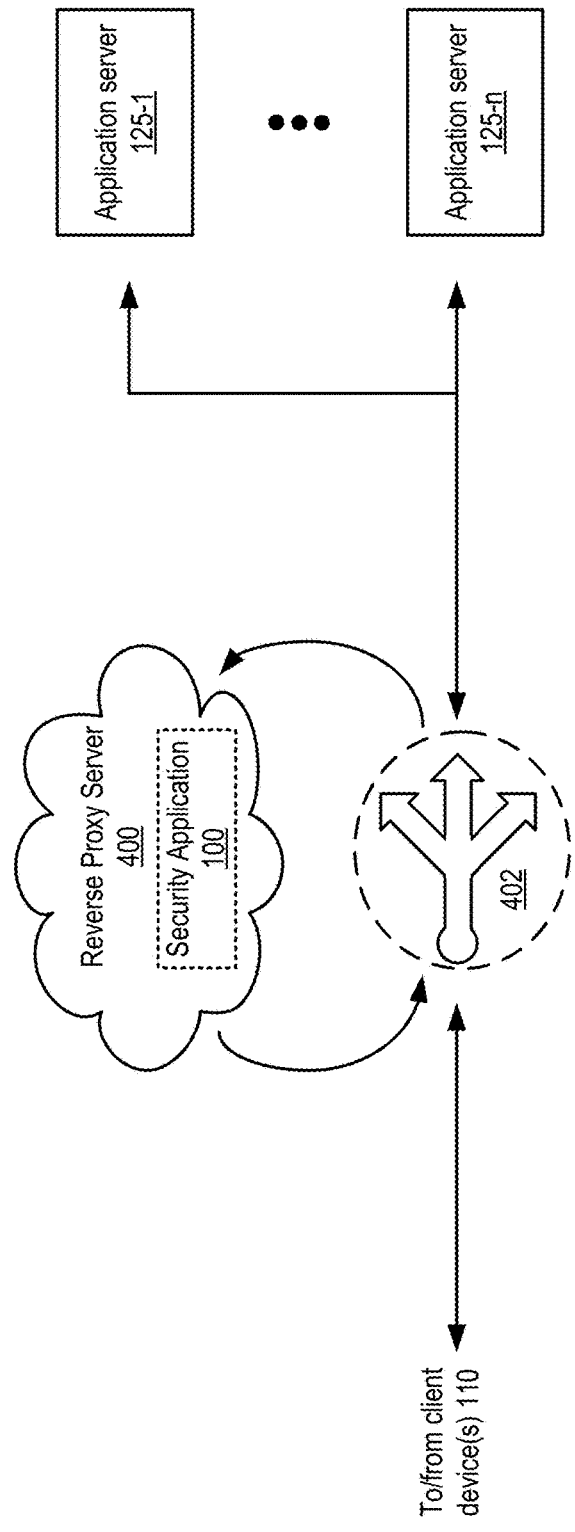

SECONDARY AUTHENTICATION PLATFORM FOR FACILITATING A MULTI-FACTOR AUTHENTICATION AND METHODS FOR USE THEREWITH

CROSS REFERENCE TO RELATED PATENTS

The present U.S. Utility Patent Application claims priority pursuant to 35 U.S.C. § 119(e) to U.S. Provisional Application No. 63/261,851, entitled "SECONDARY AUTHENTICATION PLATFORM FOR FACILITATING A MULTI-FACTOR AUTHENTICATION AND METHODS FOR USE THEREWITH", filed Sep. 30, 2021, which is hereby incorporated herein by reference in its entirety and made part of the present U.S. Utility Patent Application for all purposes.

TECHNICAL FIELD

The present disclosure relates to processing systems and applications used in end-user authentication and application security.

BRIEF DESCRIPTION OF THE SEVERAL VIEWS OF THE DRAWINGS

Reference will now be made to the accompanying drawings, which are not necessarily drawn to scale, and wherein:

FIG. 4A presents a block diagram representation of an example system.

FIG. 4B presents a block diagram representation of an example system.

DETAILED DESCRIPTION

Figure 1:
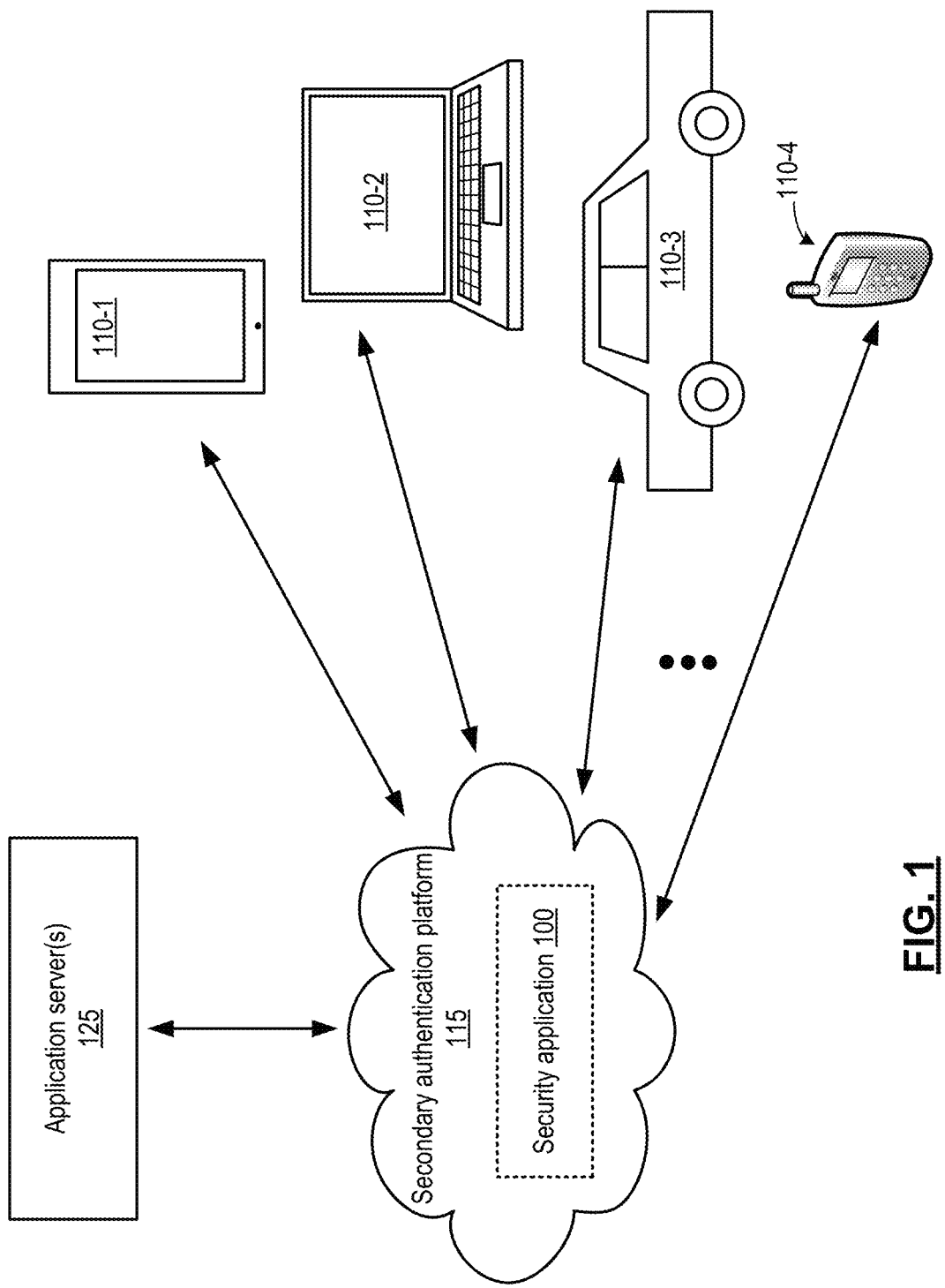
FIG. 1 presents a block diagram representation of an example system.

One or more examples are now described with reference to the drawings, wherein like reference numerals are used to refer to like elements throughout. In the following description, for purposes of explanation, numerous details are set forth in order to provide a thorough understanding of the various examples. It is evident, however, that the various examples can be practiced without these details (and without applying to any particular networked environment or standard).

FIG. 1 presents a block diagram representation of an example system. In particular, a secondary authentication platform 115 is presented that communicates data between various client devices 110, such as tablet 110-1, personal computer 110-2, connected car 110-3, smartphone 110-4, etc., and an application server 125, such as a content source, streaming service, gaming service, social media platform, online shopping site or other web server(s), via a network such as the Internet or other wide area or local area network. The data can include audio, text, images, graphics, video and/or other media content, control data, security data, authentication data, metadata, client data application data and other data transmissions.

In various examples, the secondary authentication platform 115 provides a simplified additional security layer, which is spread between web applications of the application servers 125 and users of client devices 110 (end-users). In particular, the secondary authentication platform 115 can provide an enterprise service bus (ESB) for security modules such as two-factor authentication (2FA) or other multifactor authentication (MFA) technique. Each 2FA/MFA method can be implemented completely independently from the protected applications. This means that it can be changed easily and quickly without affecting the application workflow associated with application server(s) 125.

The security application 100 of the secondary authentication platform 115 can operate to provide end-user identity protection for web applications of the application servers 125 without requiring software developers to make changes in the application code, and without vendor-lock. In various examples, the security application 100 of the secondary authentication platform 115 operates by probing, via the application server(s) to imitate an authentication process associated with an authentication factor used by the application server 125, such as simple password security or other security factor. This probing can provide a snapshot of the dataflow to and/or from the application servers. In this learning stage, the security application 100 scans for requests and responses related to user authentication. In particular, both the network traffic patterns and the user interface patterns can be collected. The security application 100 proceeds by generating, via a learning function and in response to the probing, authentication pattern data associated with this authentication factor. In various examples, the learning function operates by learning how to inject a second authentication factor directly into the user interface of the application server 125, without otherwise disrupting the first authentication process. The learning function may operate via "artificial" intelligence—i.e. machine/non-human intelligence in this fashion could not practically be performed in the human mind, particularly since the capturing and processing of high speed electronic data are required on a real-time basis.

After applying the previously learned pattern, the application of application server 125 becomes protected by the MFA method(s) selected by the user of the secondary authentication platform 115 (e.g. an administrator). During the next login, application users (end-users) will be prompted to activate the selected MFA component(s). This is made possible by the security application 100 of the secondary authentication platform 115 operating to intercept requests at the user interface level and blocking unauthorized traffic, such as in the HTTP(s) layer. The end-user remains in the domain of the protected application (no redirection to an external service). The MFA registration/use process, while provided separately from the application server 125, becomes an integral part of the protected application. This mechanism works for both traditional applications (where the HTML code is rendered completely on the server side), as well as the so-called SPA (Single-Page Apps).

The secondary authentication platform 115 described herein provides several improvements to the technology of authentication and security by providing an increased level of security for the authentication process of one or more application servers 125. The secondary authentication platform 115 further provides customizable authorization steps, without requiring changes to the application code or interference with the application code—which can be protected as a result. Security policies can be consistent and globally applied for all the applications, employees, contractors, customers and other end-users of the application of each particular application server 125—as opposed to multitudes of individual security policies that are difficult to manage and control. The additional authentication provided by security application 100 of the secondary authentication platform 115 enhances protection against phishing effects, man-in-the-middle attacks and stealing of logged-in end-user sessions—instead of leaving security and safety in the hands of end-users and simple passwords.

The security customization provided by the security application 100 of the secondary authentication platform 115 facilitates limiting access to sensitive resources only to privileged end-users (e.g. supervisors) and/or giving only privileged end-users/supervisors the ability to authorize specific features, actions or transactions. The security application 100 of the secondary authentication platform 115 allows the users/administrators of the secondary authentication platform 115 to create security layers for applications without really knowing them. In this fashion, security can be added both in the HTTP(s) protocol layer or other higher level layer and, for example, in the layers closer to the end-user such as the Document Object Model.

In addition to the functions and features described above, the security application 100 of the secondary authentication platform 115 facilitates the customization and implementation of micro-authorizations associated with one or more applications of application server(s) 125. In various examples, the security application 100 of the secondary authentication platform 115 operates by monitoring additional data transmissions from the client device to the application server for a plurality of actions associated with micro-authorization. When the additional data transmissions from the client device to the application server include one of the plurality of actions associated with micro-authorization, the secondary authentication platform 115 operates by communicating with the client device to perform a further authentication via an authentication factor associated with the micro-authorization. This may include reauthorizing the end-user via the same secondary authentication as previously required for the end-user to access the application of the application server 125—or some different authentication factor for the end-user and/or his/her supervisor.

This functionality makes it possible to stop the application/end-user when he/she attempts to access specific resources or wants to perform some specific actions in the protected application. In such a case, the secondary authentication platform 115 can take over communication and triggers one of two scenarios:
1. In the OWNER scenario, the secondary authentication platform 115 requires the end-user to re-authenticate,
2. In the SUPERVISOR scenario, the secondary authentication platform 115 asks the end-user to authenticate via a supervisor or via other supervisory privileges.

Because the secondary authentication platform 115 operates as an intermediate security layer, micro-authorizations can be added inside of the application quickly and easily without changes to the application code. Micro-authorizations (in the OWNER scenario) introduce an increased level of granulation under the Principle of Least Privilege. This means additional protection against attack on a stolen active session or other attacks against an already logged-in end-user (including real-time phishing or malware attacks). Micro-authorizations (in the SUPERVISOR scenario) leave authorization of particularly sensitive resources requests in the hands of selected and trusted end-users/supervisors. Regardless of the scenario, the additional effect of micro-authorizations is the protection of sensitive resources against risks such as: automatic export (with or without the consent of the end-user) uncontrolled leakage of confidential data through the application interface.

In various examples, micro-authorizations via the secondary authentication platform 115 can use U2F/FIDO2 cryptographic keys or local authenticators compliant with the WebAuthn standard. In the case of the OWNER scenario, the access to the protected resource can require the end-user to simply touch the cryptographic key that was used during the authentication. In the case of SUPERVISOR scenario, access to the protected resource can require the same action as above but needs to be performed by the privileged end-user (supervisor) with a privileged cryptographic key. Events related to any and all micro-authorizations can be logged in the secondary authentication platform 115 or streamed to an external logging system. In either case, these logs can be analyzed to detect anomalies.

The further operation of these systems including the secondary authentication platform 115 will be described in greater detail in conjunction with FIGS. 2, 3A-3S, 4A-4C, and 5 that follow, including several optional functions and features and examples thereof.

Figure 2:
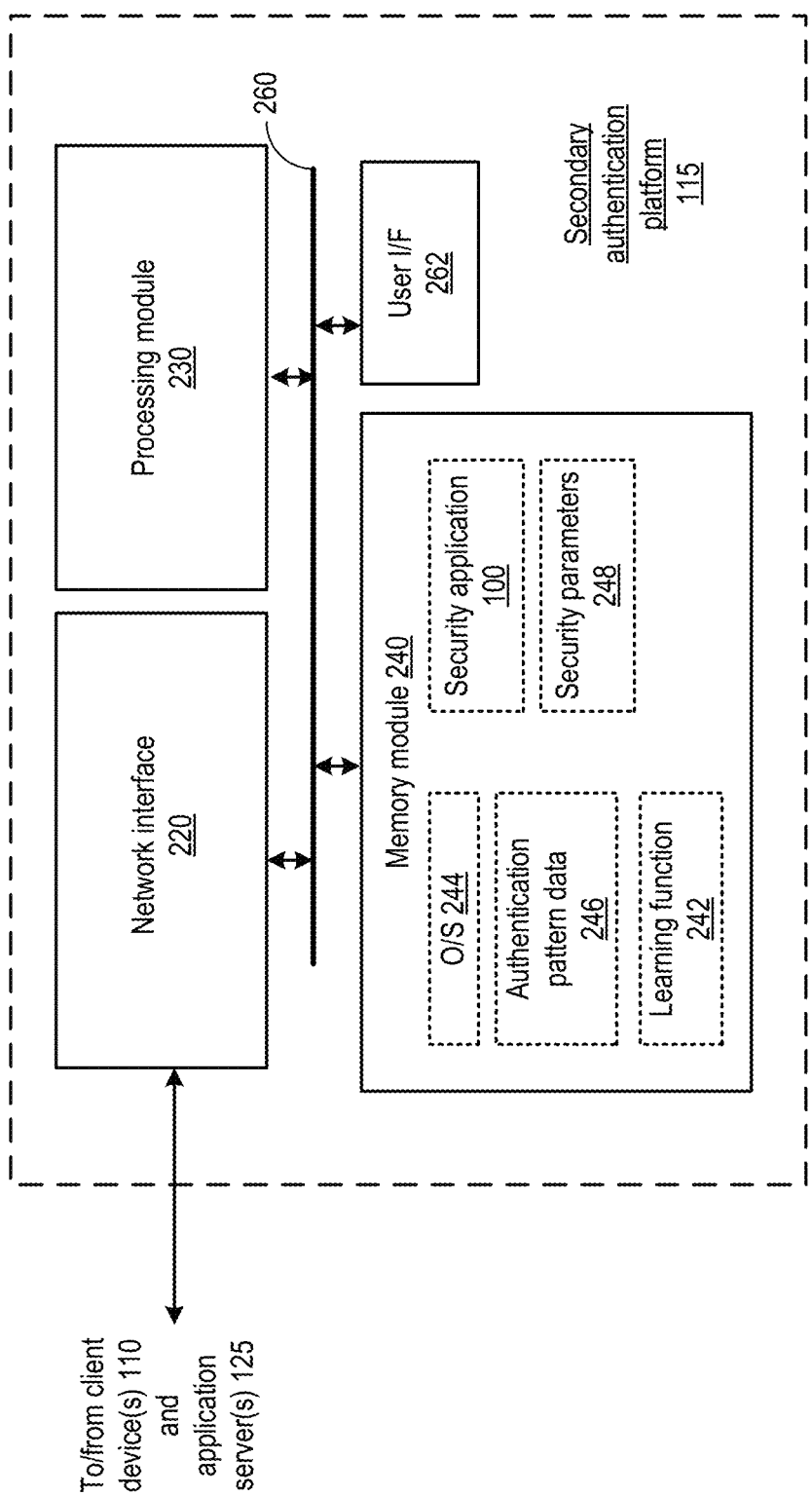
FIG. 2 presents a block diagram representation of an example secondary authentication platform.

FIG. 2 presents a block diagram representation of an example secondary authentication platform. In particular, the secondary authentication platform 115 includes a network interface 220 such as network card, an Ethernet interface and/or other wired or wireless interface or modem for communicating for communicating via a network, and in particular, is configured to facilitate communications between one or more client devices 110 and application server(s) 125 via such a network.

The secondary authentication platform 115 also includes a processing module 230 and memory module 240 that stores learning function 242 such as an imitating function, pattern recognition function or other artificial intelligence (AI) function, an operating system (O/S) 244 such as an Apple, Unix, Linux or Microsoft operating system or other operating system, security application 100, authentication pattern data 246, and security parameters 248 that, for example, store data used to customize the functions and features of the security application 100. In particular, the O/S 244, learning function 242 and security application 100 each include operational instructions that, when executed by the processing module 230, cooperate to configure the processing module into a special purpose device to perform the particular functions of the secondary authentication platform 115 described herein. While the learning function 242 is shown as separate from the security application, it should be noted that the learning function 242 can be implemented within the security application 100.

The secondary authentication platform 115 can also include a user interface (I/F) 262 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to a user/administrator of the secondary authentication platform 115 and that generate data in response to the user's/administrator's interaction with the secondary authentication platform 115 to control various functions of the security application 100. The user interface 262 can operate as a graphical user interface. In other examples, the secondary authentication platform may be a virtual machine without a user interface.

The processing module 230 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 240. The memory module 240 can include a hard disc drive or other disc drive, solid state drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 260, other architectures are possible including additional data buses and/or direct connectivity between one or more elements. Further, the secondary authentication platform 115 can include one or more additional elements that are not specifically shown.

In operation, the secondary authentication platform 115 executes the security application 100. In particular, the memory module 240 stores operational instructions that, when executed by the processing module, cause the processing module 230 to perform operations that include:

probing, via the network interface 220, an application server 125 to imitate an authentication process associated with a first authentication factor, such as a password authentication or other authentication factor used by the application server 125;

generating, via the learning function 242 and in response to the probing, authentication pattern data 246 associated with the first authentication factor; monitoring data transmissions from a client device 110 that are directed to the application server 125;

identifying authentication data associated with the first authentication factor in the data transmissions from the client device 110 based on a comparison of the authentication data to the authentication pattern data 246—this identifying can include determining that the data transmissions include data that matches the authentication pattern data 246 within a certain predefined tolerance, confidence level, or threshold;

communicating with the client device 110 via the network interface 220 to authenticate an end-user of the client device 110 to the secondary authentication platform 115 via a second authentication factor, such as a time based one-time password (TOTP) authentication, fast identity online (FIDO) web authentication, FIDO2, certificate based authentication, biometric authentication, token-based authentication and/or other single or multifactor authentication (MFA) technique; and when the end-user of the client device is authenticated to the secondary authentication platform 115 via the second authentication factor, forwarding the authentication data to the application server to authenticate the end-user of the client device to the application server via the authentication process associated with the first authentication factor. In various examples, the secondary authentication platform 115 operates as a man in the middle and reverse proxy (e.g., a reverse proxy server) in the communications between the client device(s) 110 and the application server(s) 125. The secondary authentication platform 115 can be located in the network—inline between the application server(s) 125 and the client device(s) 110, such as between a client device and a load balancer associated with a set of application servers 125, or between the application servers 125 and their load balancer. In a further example, the secondary authentication platform 115 can be co-located with or otherwise integrated with the operation of a load balancer associated with the application server(s) 125, in a wrapped configuration so as to receive client device traffic received at the load balancer and provide traffic destined for the application server(s) 125 back to the load balancer for load balancing such traffic.

The operations of the secondary authentication platform 115 can further include: forwarding additional data transmissions from the client device 110 to the application server after the end-user of the client device 110 is authenticated to the secondary authentication platform 115 via the second authentication factor; and blocking the additional data transmissions from the client device 110 to the application server 125 when the end-user of the client device 110 is not authenticated to the secondary authentication platform via the second authentication factor.

The operations of the secondary authentication platform 115 can further include: monitoring additional data transmissions from the client device 110 to the application server 125 for any of a plurality of actions associated with micro-authorization; and when the additional data transmissions from the client device to the application server include one of the plurality of actions associated with micro-authorization, communicating with the client device 110 via the network interface to perform a further authentication via an authentication factor associated with the micro-authorization. When the further authentication is successful, the secondary authentication platform 115 can forward the addition data transmissions to the application server. When the further authentication is unsuccessful, the secondary authentication platform 115 can block the addition data transmissions to the application server 125.

In various examples, the plurality of actions associated with the micro-authorization can include requests or other commands to perform a POST, a GET, a PUT, a PATCH or a DELETE operation. Furthermore, the particular actions to be subjected to micro-authorization can be set up and customized via the user interface 262. In this fashion, so that one or more particular actions can be selected and furthermore, the particular type of authentication can be selected for each selected action. As previously discussed, the authentication factor associated with the micro-authorization can be customized to require authentication via a supervisor that may be different from the end-user, if the end-user is not himself/herself a supervisor.

It should be further noted that the security parameters 248 can include data stored in memory module 240 that identifies authorized end-users and supervisors, selected actions associated with micro-authentication, the authentications type or types to be associated for each such action, a selection of one or more of a plurality of second authentication types to be employed, and/or data that indicates, and/or is associated with, other selections, options and/or customizations available via the security application 100.

In various examples, the operations of the probing of the application server 125 and the generating of the authentication pattern data 246 are performed in response to selection, via the user interface 262, of a learning mode. The other operations of the security application 100 can be performed when the learning mode is exited.

Figure 3A:
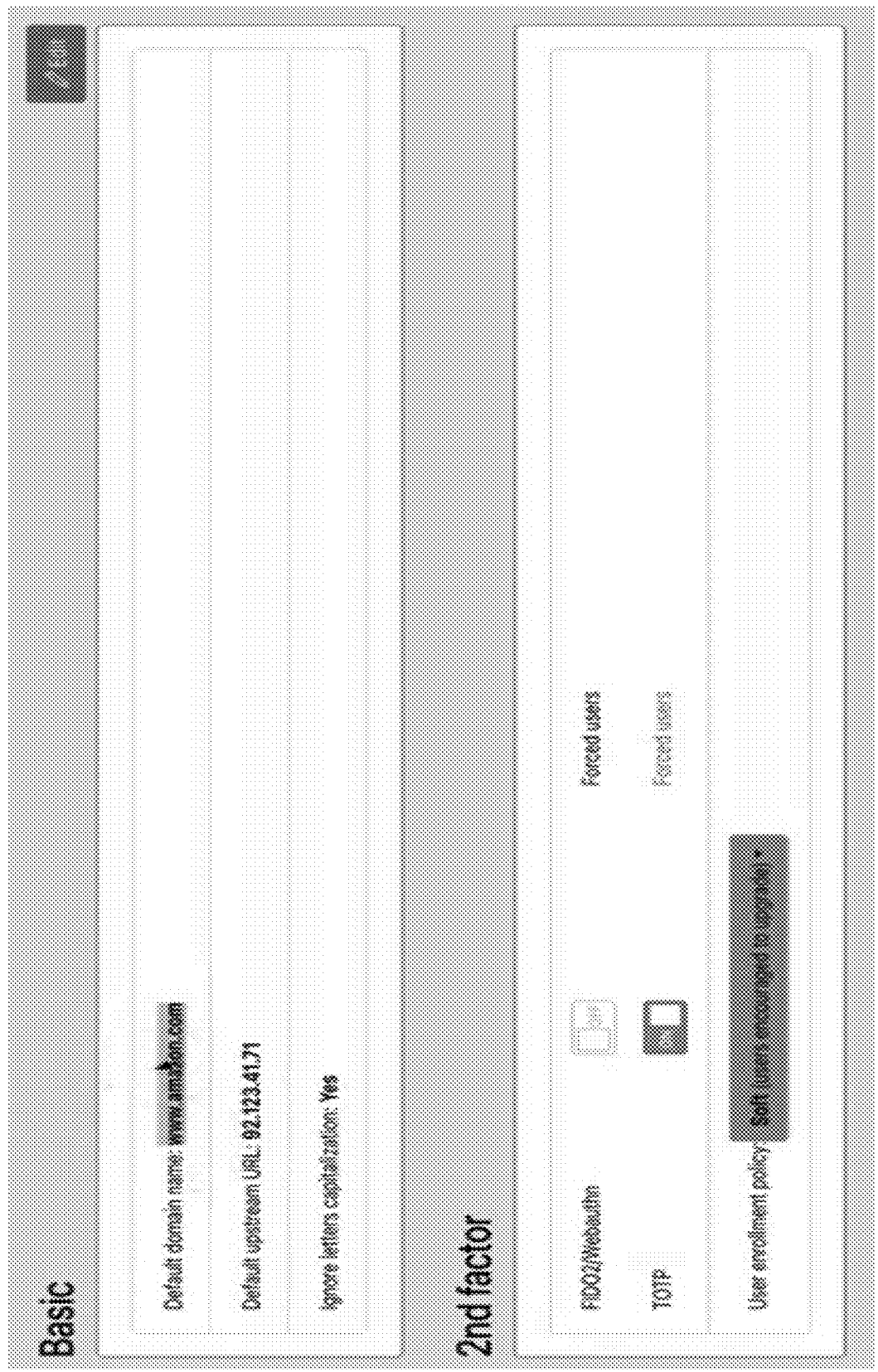
FIGS. 3A-3S present graphical diagram representations of example screen displays.
Figure 3B:
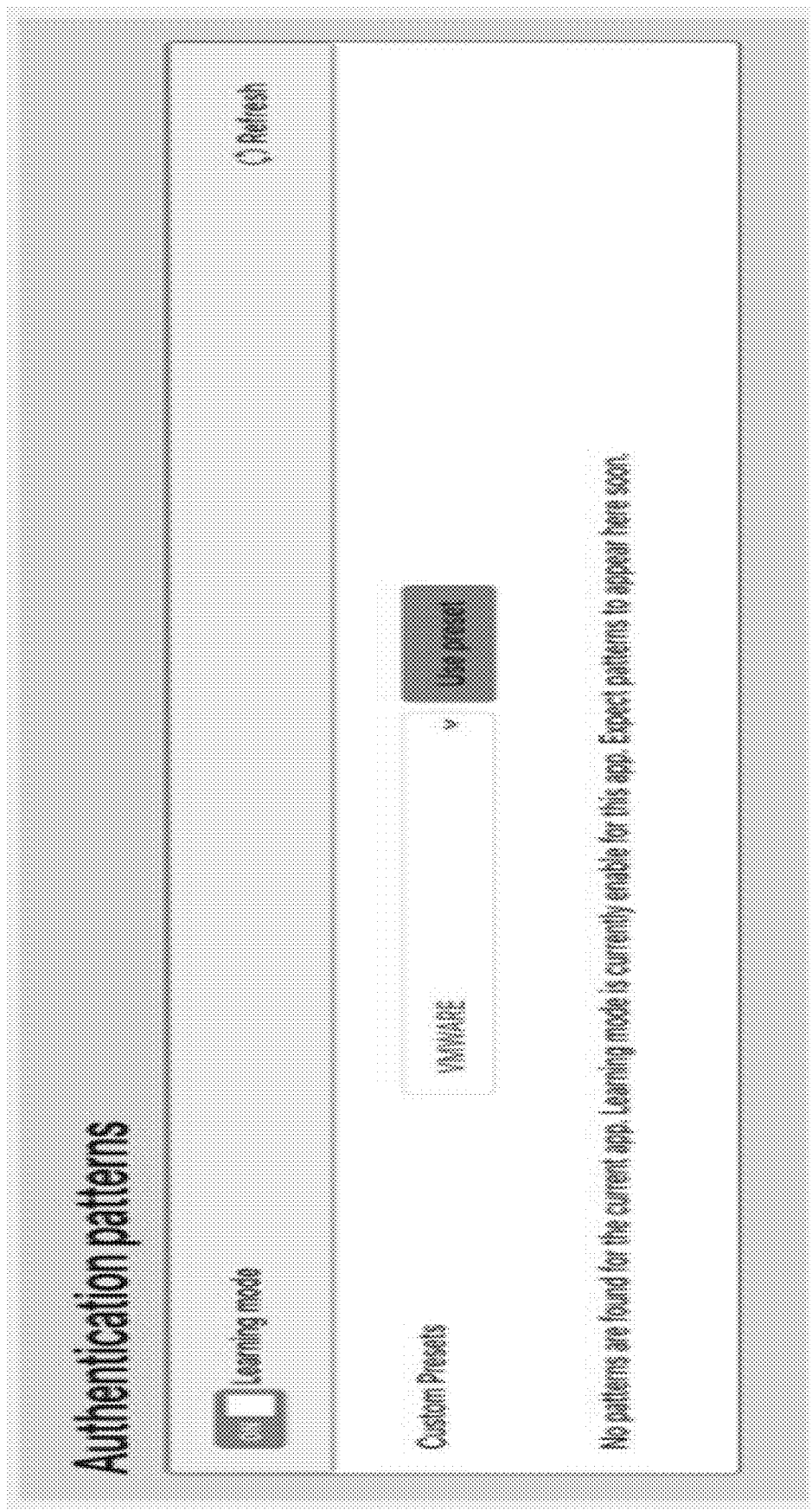
Figure 3C:
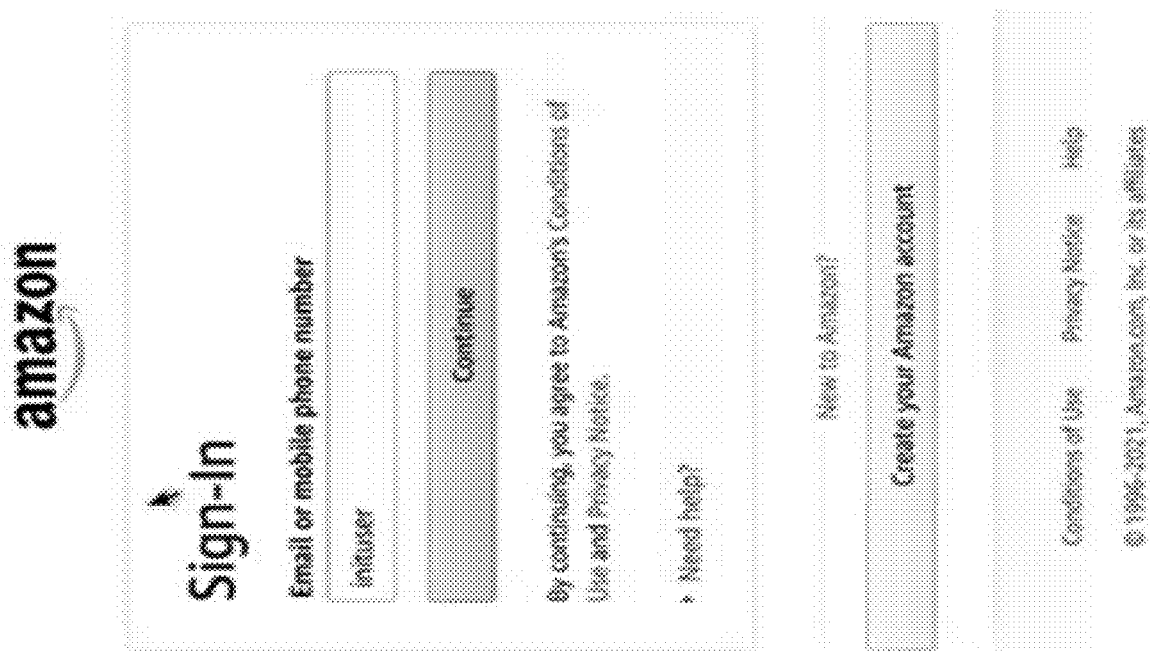
Figure 3D:
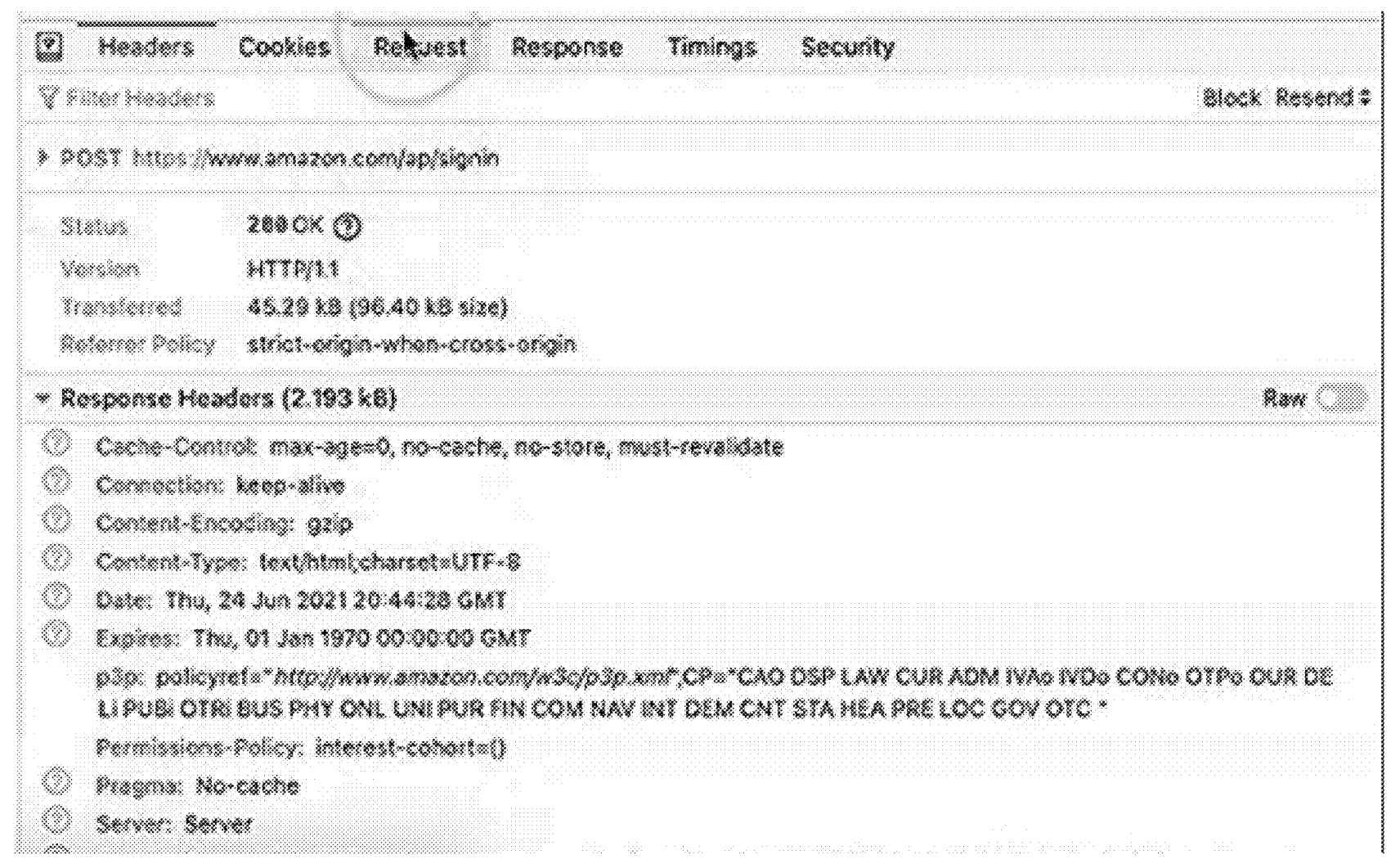
Figure 3E:
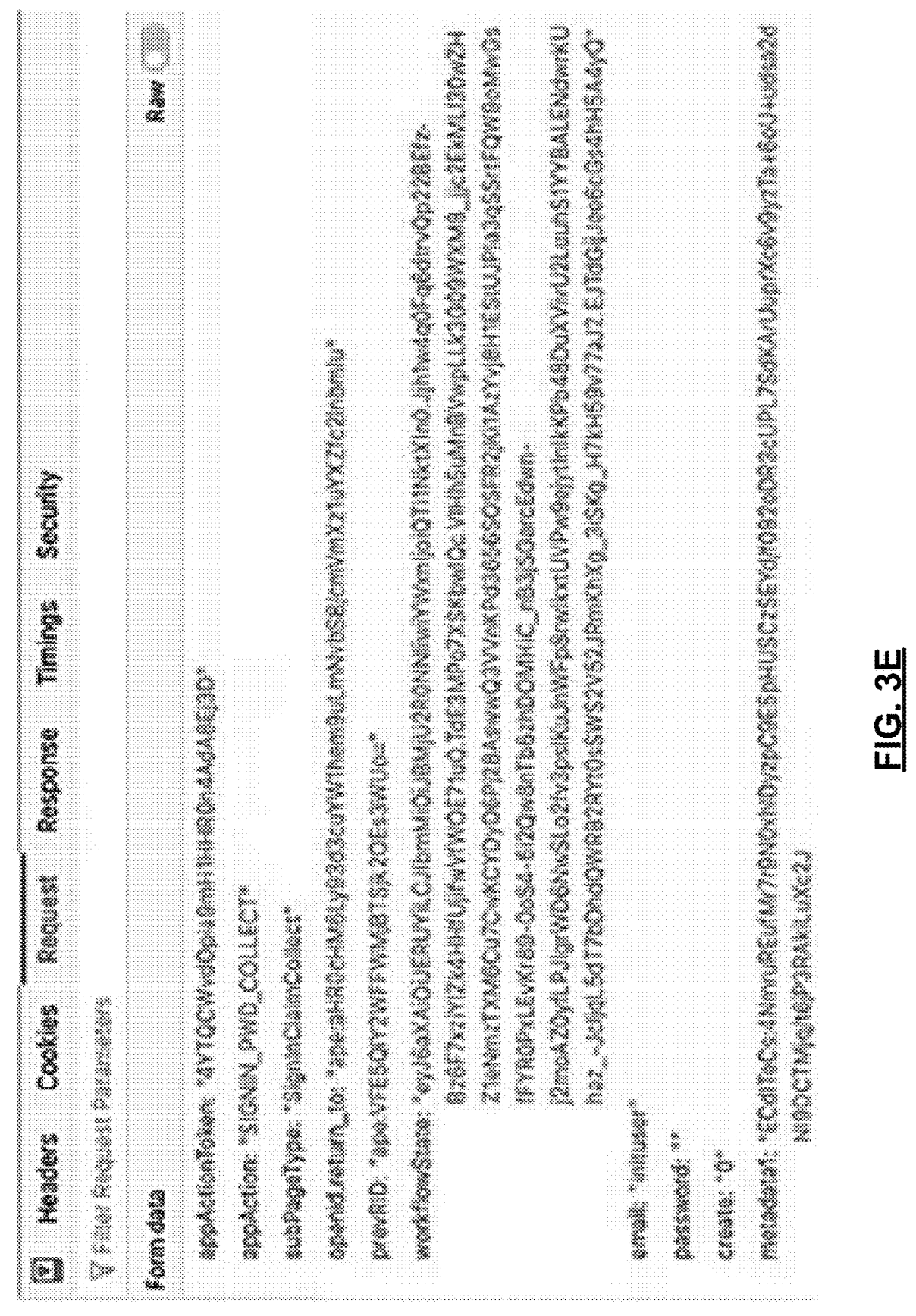
Figure 3G:
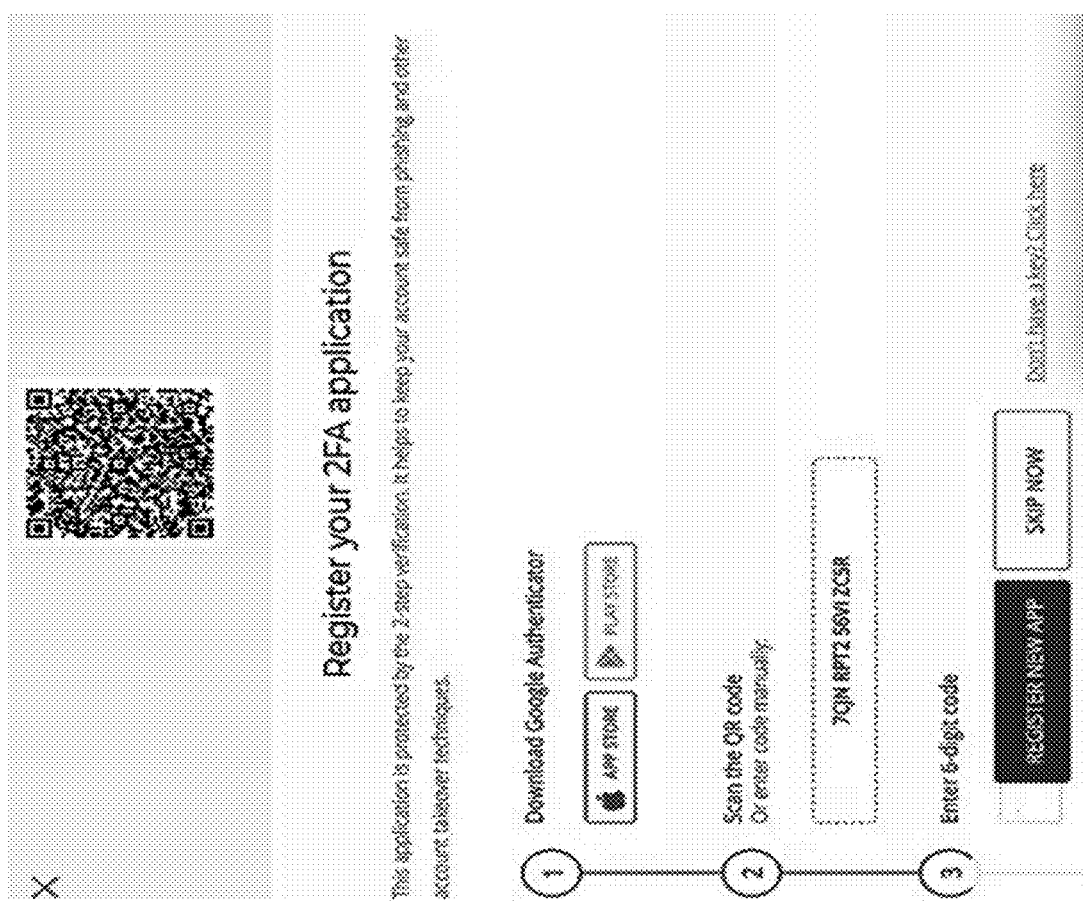
Figure 3F:
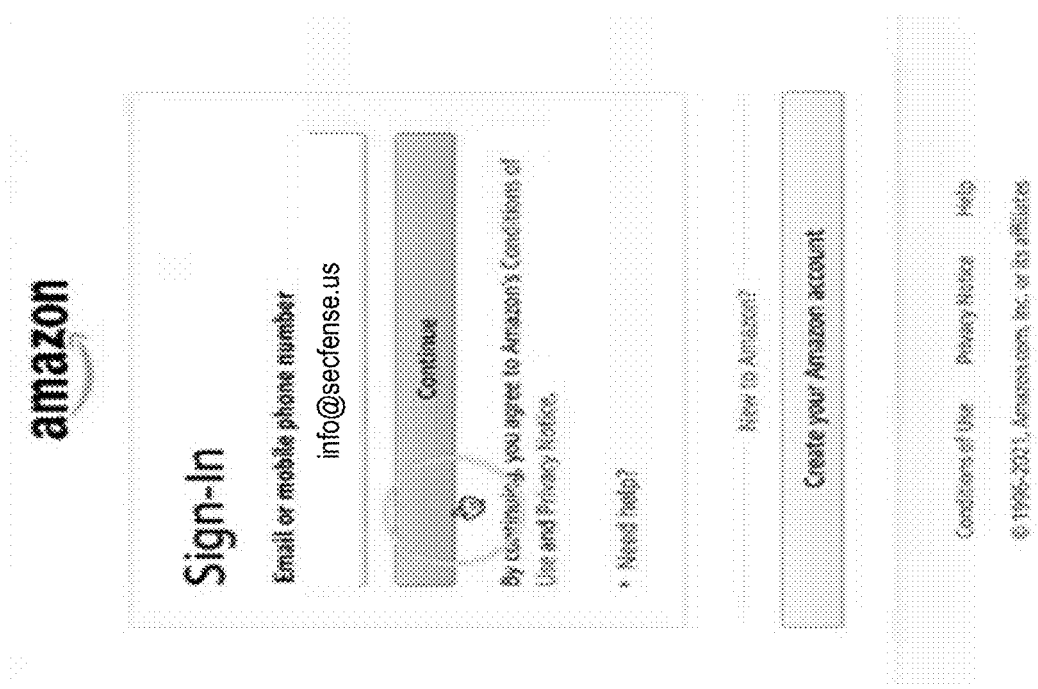
Figure 3H:
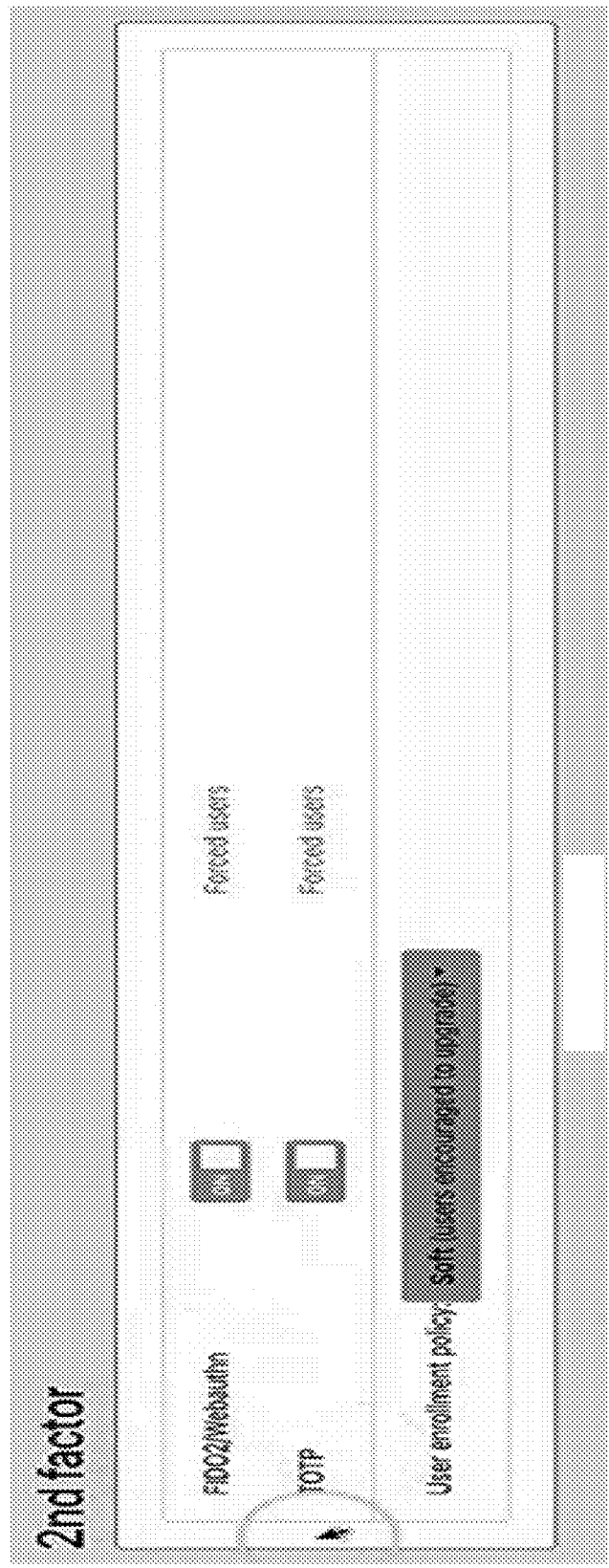
Figure 3I:
Figure 3J:
Figure 3K:
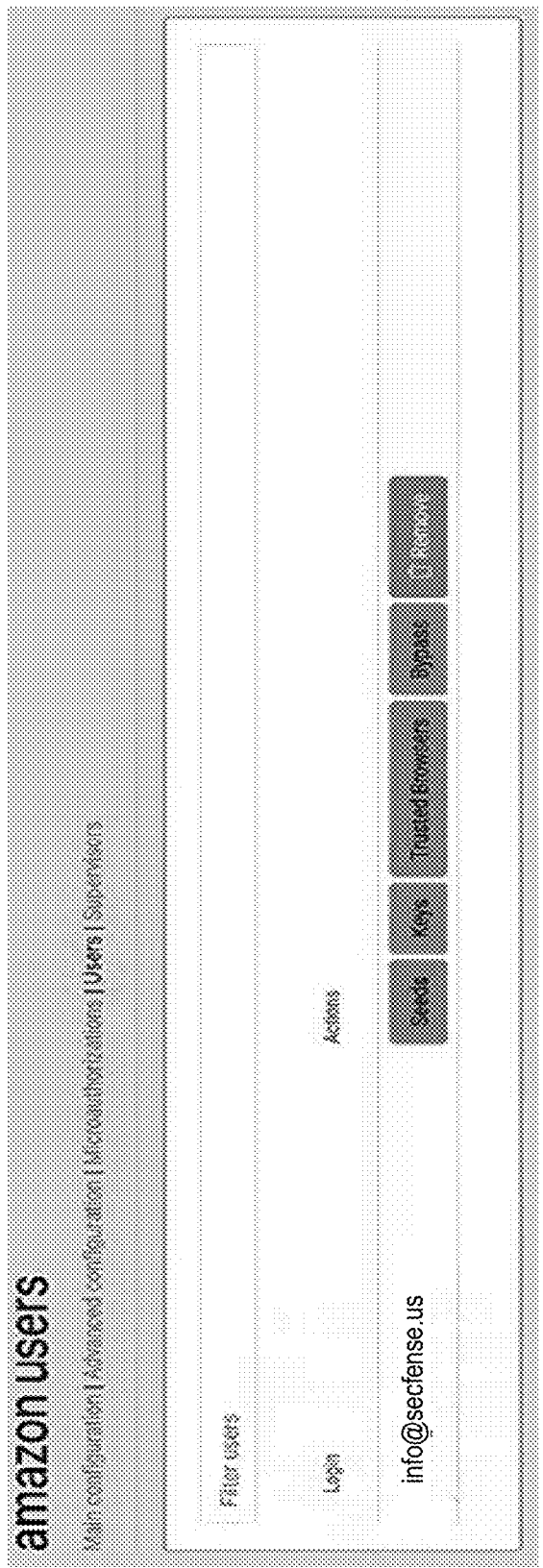
Figure 3L:
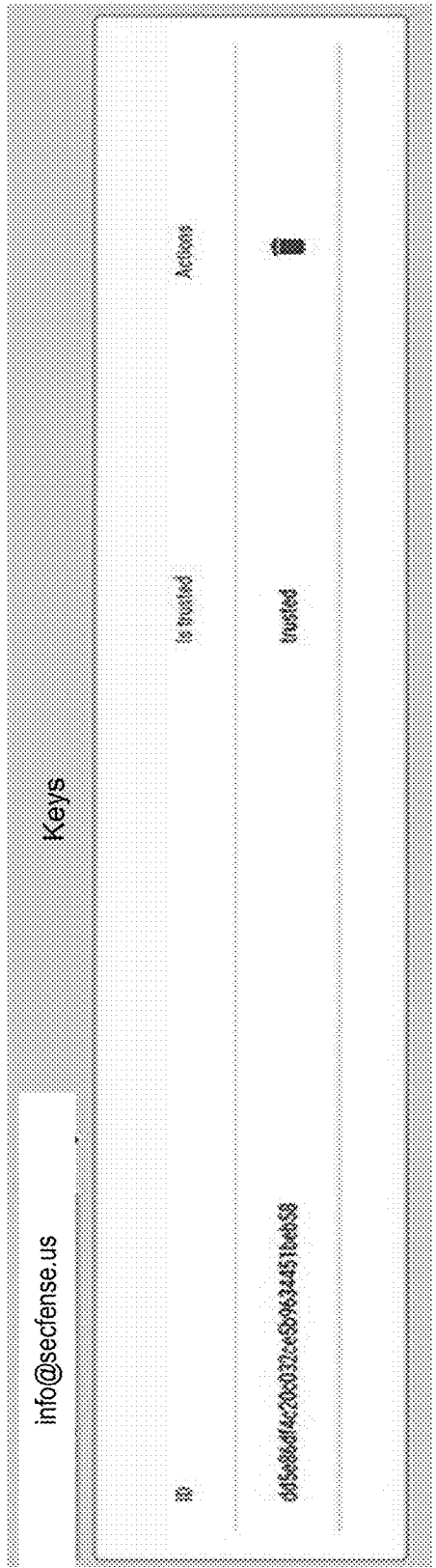
Figure 3M:
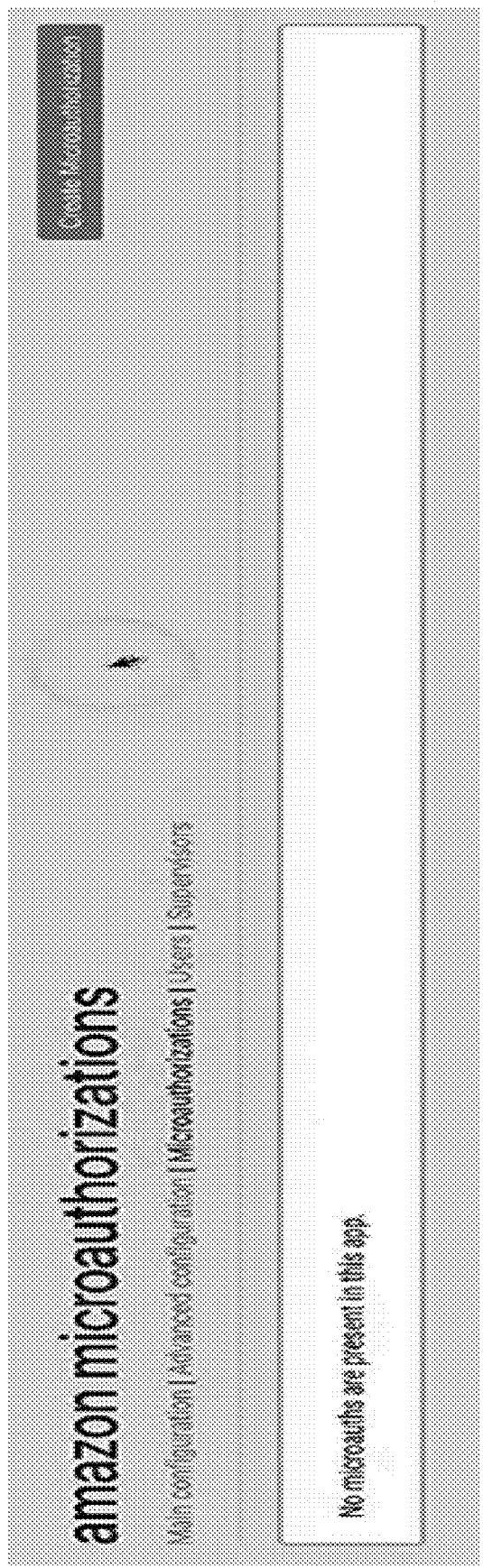
Figures 3N, 3O:
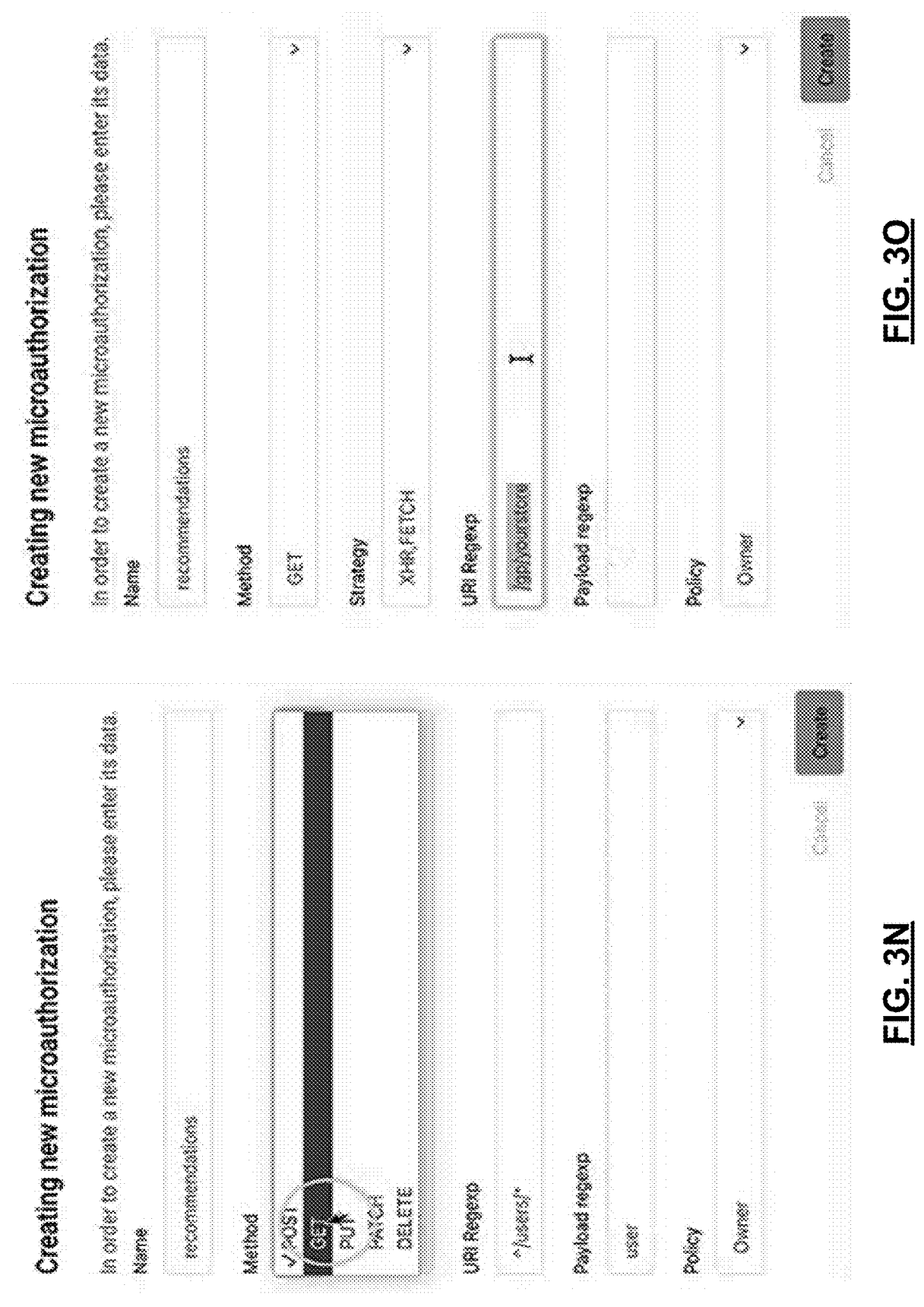
Figure 3P:
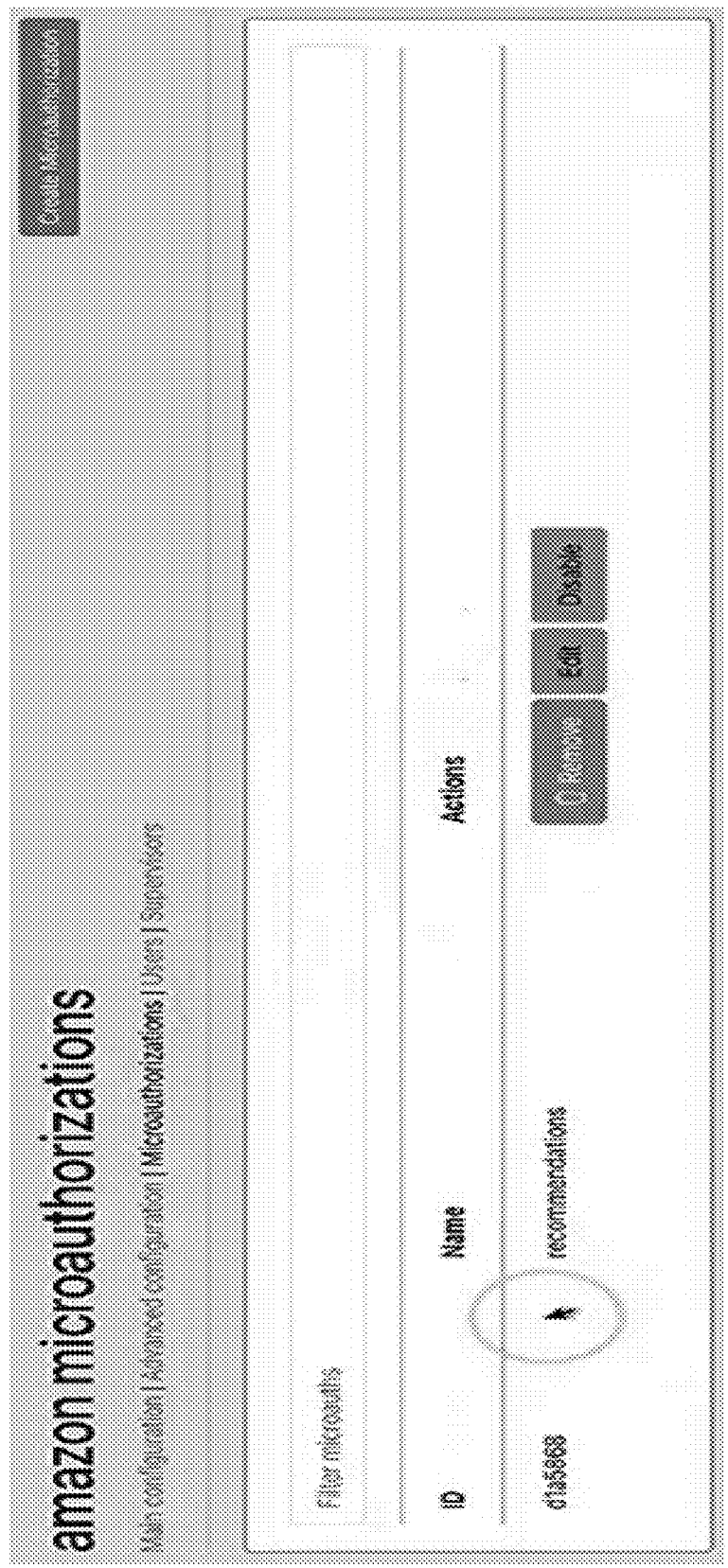
Figures 3Q, 3R:
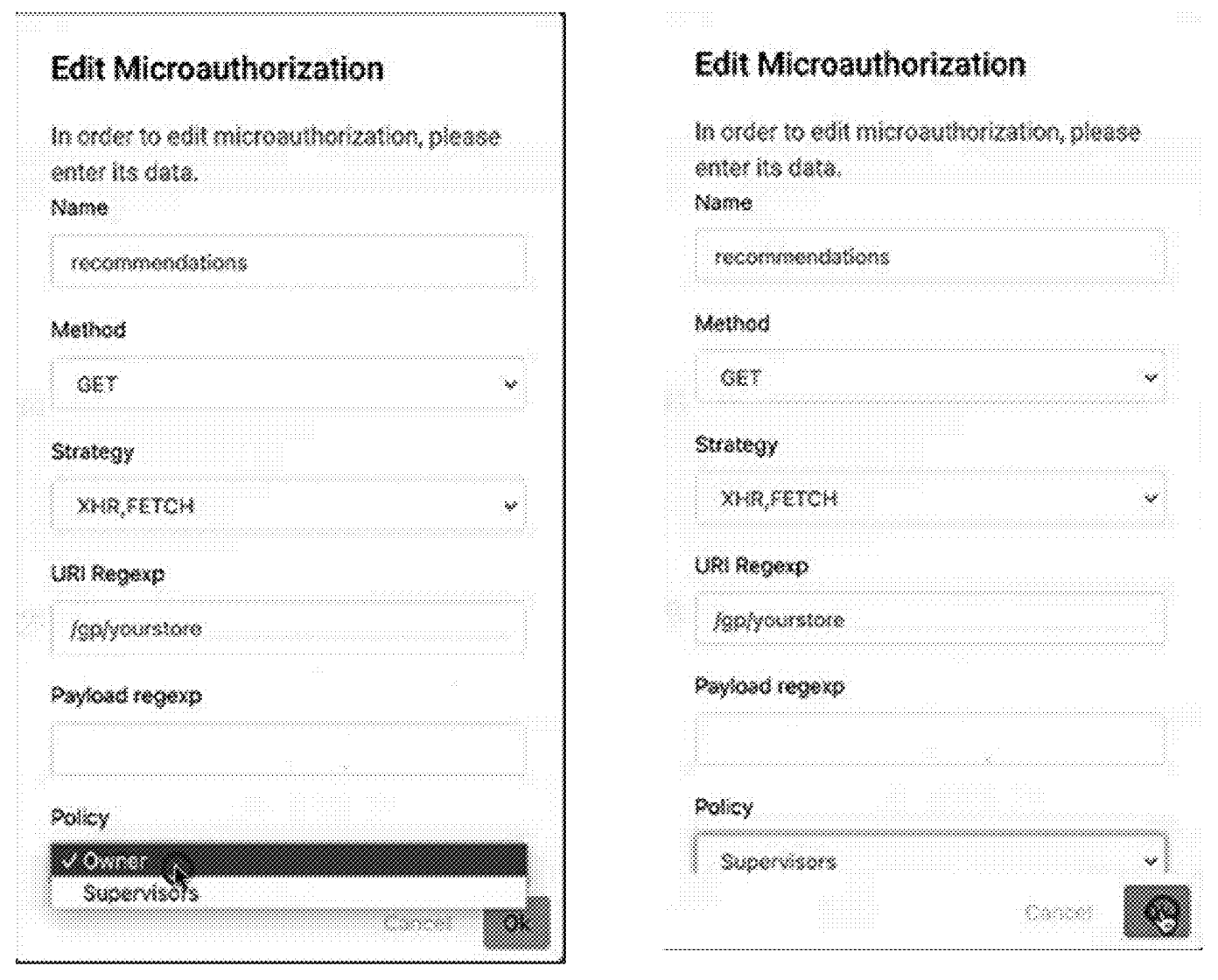
Figure 3S:
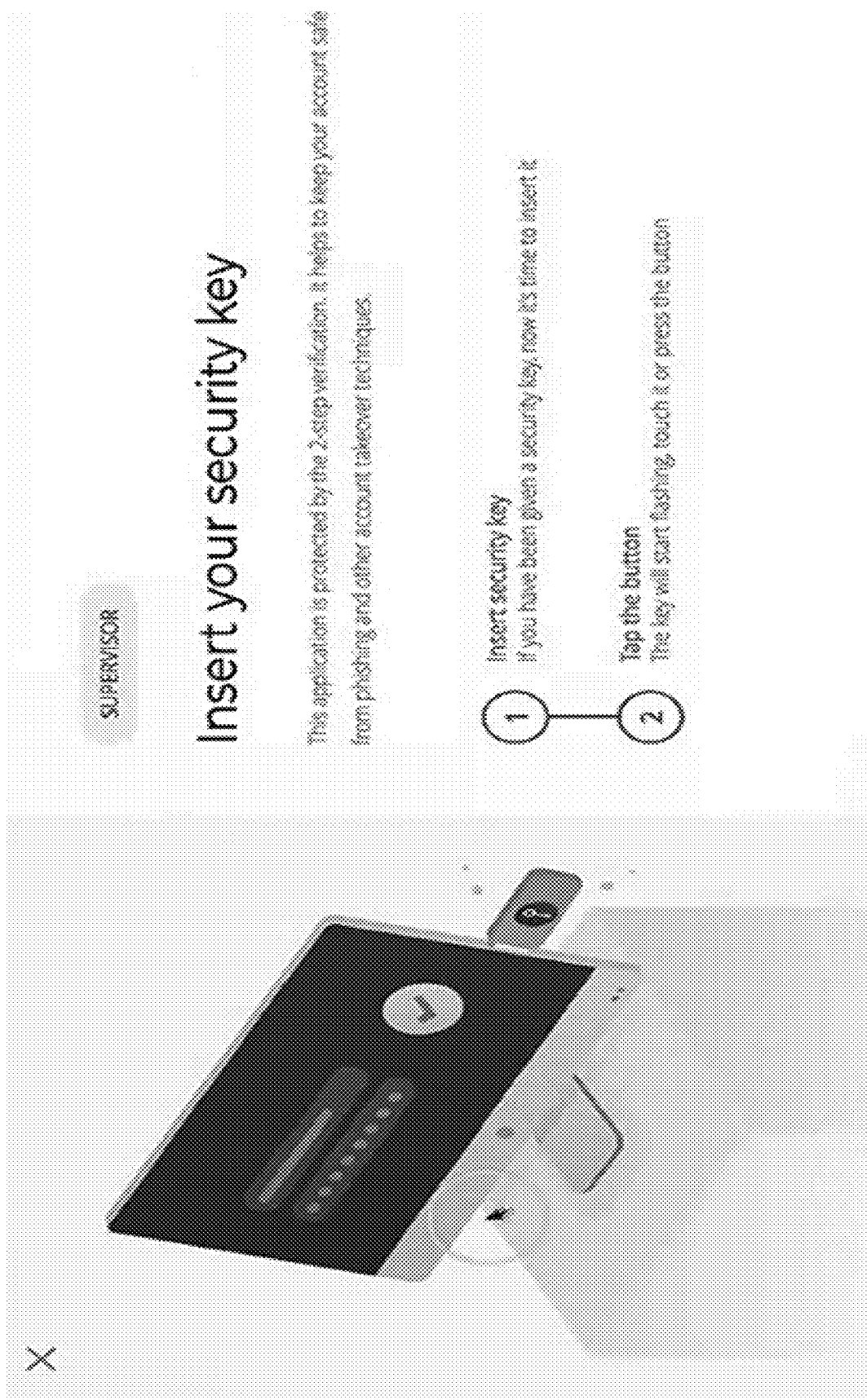

FIGS. 3A-3S present graphical diagram representations of example screen displays. In particular screen displays are shown that are generated by the security application 100 and displayed on either user interface 262 or a display screen of a client device 110. Consider an example where the secondary authentication platform 115 is located in the network inline between the application server(s) 125 and the client device(s) 110. The secondary authentication platform 115 operates as a reverse proxy to monitor communications from client device(s) 110 to the particular application. These communications are not pointed to the application server(s) 125 directly, but are directed instead to the secondary authentication platform 115. In various examples, the communication with the application server 125 is temporarily "frozen" (on the UI level). At the same time and in parallel, the secondary authentication platform 115 operates to inject the MFA logic into the UA After the user has dealt with the MFA, the communication with the application server 125 is unfrozen, but is enriched with additional data that lets the communication pass the proxy.

Turning to FIG. 3A, the user/administrator of the secondary authentication platform 115 is setting up secondary authentication via TOTP for the domain name www.amazon.com. In this case, the user enrollment policy is set to soft, encouraging end-users to opt in. In other examples, however, the user/administrator can instead set the enrollment policy to "hard" where end-users are forced to use the selected method of secondary authentication.

Turning to FIG. 3B, the user/administrator has enabled the learning mode. When learning is applied by the user/administrator, the secondary authentication platform 115, the security application 100 probes the application server associated with amazon by imitating an authentication procedure by a client device. In the example shown in FIG. 3C, Amazon login is initiated by the security application 100, imitating the operation of a client device 110, for a dummy user ID "inituser".

The learning function 242 retrieves authentication data associated with the dummy authentication attempt for "inituser", such as header information and request data presented in conjunction with FIGS. 3D and 3E. This data, or portions thereof, can be stored as authentication pattern data 246. Thereafter, when the learning mode is exited, the authentication pattern data 246 can be applied to the communications and used to identify future authentication requests from client devices 110. In particular, communications from the client device are monitored for data matching the authentication pattern data 246.

Turning to FIG. 3F, an end-user of a client device 110 having a user ID info@secfense.us attempts to log in to their Amazon account. The security application 100 detects the authentication data in the end-users' communications and sends a 2FA prompt to the client device 110 and shown in FIG. 3G. In circumstances where, as shown in FIG. 3H, both FIDO2 and TOTP authentications are selected by the user/administrator based on a soft user enrollment policy, the 2FA prompt can indicate both authentication techniques as shown in FIG. 3I. Given the soft enrollment policy, the end-user is allowed to skip the second authentication—after which the end-user is allowed to complete the password authentication with Amazon—with the password authentication session data being passed by the security authentication platform 115 to the Amazon server.

Following the example above, in the case where the end-user has implied FIDO2 authentication, the security application 100 presents the client device 110 with a prompt to complete second authentication as shown in FIG. 3J.

Once the second factor authentication is completed, the end-user is then allowed to complete the password authentication with Amazon—with the password authentication session data being passed by the security authentication platform. In various examples, the security application generates a certificate associated with an authenticated end-user that can be stored, for example, as a cookie on the client device 110 associated with the end-user as well as in the security parameters 248 associated with the end-user. Data transmissions by end-user's client device 110 directed to Amazon will include that cookie and can be used by the security application 100 to know such monitored transmissions can be passed by the secondary authentication platform 115 to Amazon. Furthermore, the presence of the cookie in such communications forwarded to Amazon will not affect Amazon, since the cookie can be ignored. In addition to the information described above, the security application 100 can keep a record of user IDs of end-users as shown in FIG. 3K and, if applicable, their authentication keys as shown in FIG. 3L as well as seeds, trusted browsers, bypass elections, etc. that can be included in security parameters 248.

Turning to FIG. 3M, the user/administrator of the secondary authentication platform 115 is presented with a screen that shows micro-authorizations for a particular application (in this case Amazon). In this case, none have been set, however the user/administrator can opt to create a new micro-authorization. As shown in FIG. 3N, the user/administrator begins to create a new micro-authorization for the recommendations feature of the Amazon website. Because this uses a GET request, "GET" is selected from the menu. In FIG. 3O, the user/administrator enters the URL extension "/gp/yourstore/" associated with the recommendations feature and sets a policy that owner (i.e. end-user) reauthentication is required when accessing this feature. In FIG. 3P, the recommendations micro-authorization now appears in the Amazon list.

When the communications from a client device 110 include a GET request associated with this Amazon recommendations feature, the secondary authentication platform 115 generates a prompt, similar to FIG. 3J for example, for additional authentication of the end-user. If the authentication succeeds, the GET request associated with this Amazon recommendations feature is passed to Amazon, otherwise it is blocked.

Turning to FIGS. 3Q and 3R, the user/administrator has opted to change the recommendations micro-authorization to requiring supervisor authentication. Consider the case where the end-user of client device 110 (who is not a supervisor) has been properly authenticated both by Amazon via password and by the secondary authentication platform 115 via a second factor. The end-user is permitted access to the Amazon website—but when the communications from a client device 110 include a GET request associated with this Amazon recommendations feature, the secondary authentication platform 115 generates a prompt, shown in FIG. 3S, for additional authentication of the supervisor. If the authentication succeeds (e.g., the end-user gets his supervisor to perform the authentication), the GET request associated with this Amazon recommendations feature is passed to Amazon, otherwise it is blocked.

FIGS. 4A-4B presents block diagram representations of example systems. In particular, example systems are presented that include several similar elements to the system of FIG. 1 that are referred to by common reference numerals. In FIG. 4A, the secondary authentication platform 115 is implemented via a reverse proxy server 400 that is placed in the network between the load balancer 402 and the application servers 125-1 . . . 125-n. In FIG. 4B, the secondary authentication platform 115 is implemented via a reverse proxy server 400 that is integrated with the load balancer 402 associated with the application servers 125-1 . . . 125-n. Additionally, the secondary authentication platform 115 can be implemented via a reverse proxy server 400 located in-between client device(s) (110) and the app server(s) 125 as an active network traffic component—without a load balancer.

Figure 5:
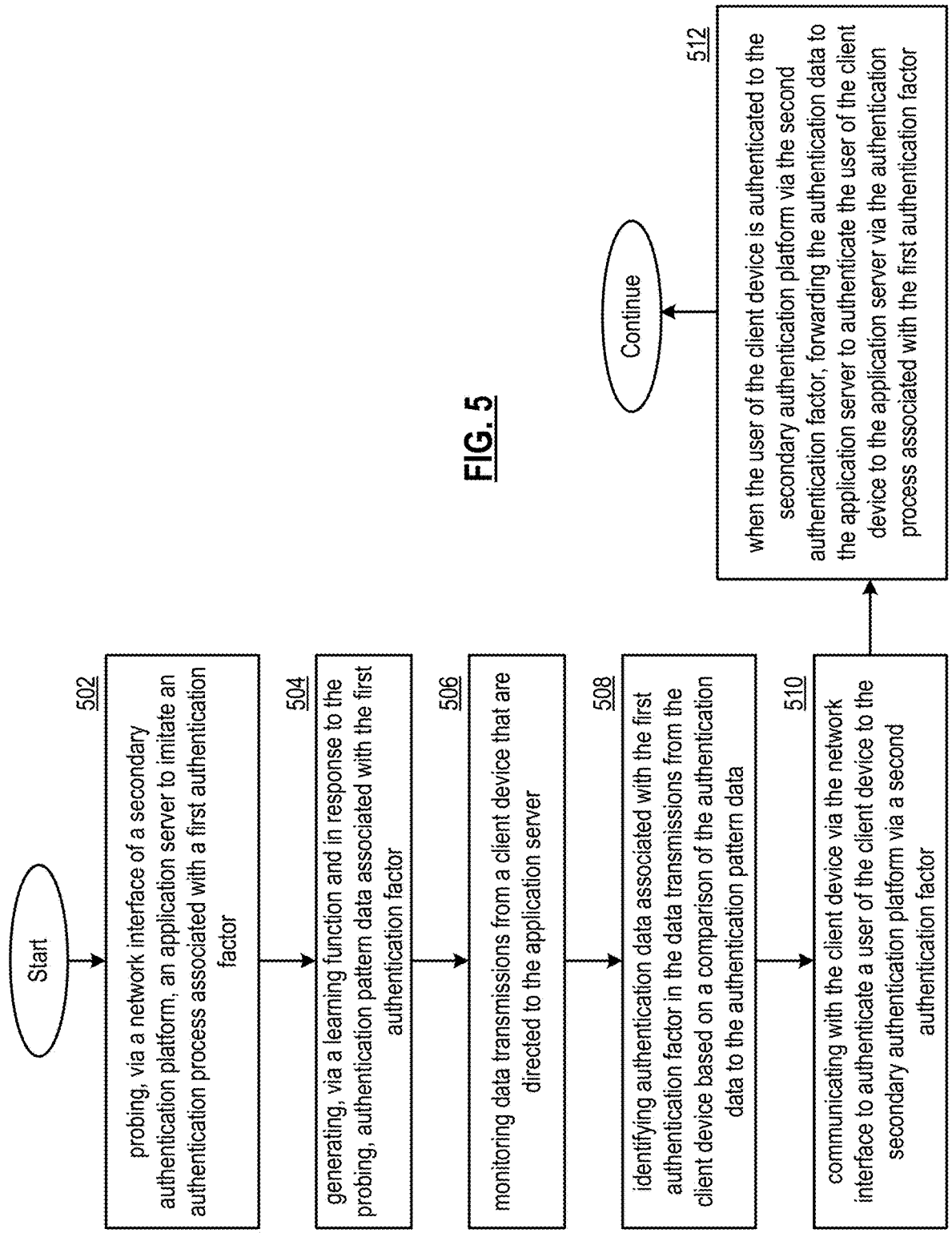
FIG. 5 presents a flowchart representation of an example method.

FIG. 5 presents a flowchart representation of an example method. In particular, a method is presented for use in conjunction with one or more functions and features described in conjunction with FIGS. 1, 2, 3A-3S, and 4A-4B. Step 502 includes probing, via a network interface of a secondary authentication platform, an application server to imitate an authentication process associated with a first authentication factor. Step 504 includes generating, via a learning function and in response to the probing, authentication pattern data associated with the first authentication factor. Step 506 includes monitoring data transmissions from a client device that are directed to the application server. Step 508 includes identifying authentication data associated with the first authentication factor in the data transmissions from the client device based on a comparison of the authentication data to the authentication pattern data. Step 510 includes communicating with the client device via the network interface to authenticate an end-user of the client device to the secondary authentication platform via a second authentication factor. Step 512 includes forwarding the authentication data to the application server to authenticate the end-user of the client device to the application server via the authentication process associated with the first authentication factor—when the end-user of the client device is authenticated to the secondary authentication platform via the second authentication factor.

In various examples, the communications between the client device and the application server are in accordance with a reverse proxy. The secondary authentication platform can be located in a network between the application server and a load balancer associated with the application server or integrated with a load balancer associated with the application server.

The method can further include: forwarding additional data transmissions from the client device to the application server after the end-user of the client device is authenticated to the secondary authentication platform via the second authentication factor; and blocking the additional data transmissions from the client device to the application server when the end-user of the client device is not authenticated to the secondary authentication platform via the second authentication factor.

The method can further include: monitoring additional data transmissions from the client device to the application server for a plurality of actions associated with micro-authorization; and when the additional data transmissions from the client device to the application server include one of the plurality of actions associated with micro-authorization, communicating with the client device via the network interface to perform a further authentication via an authentication factor associated with the micro-authorization.

The method can further include: when the further authentication is successful, forwarding the addition data transmissions to the application server; and when the further authentication is unsuccessful, blocking the addition data transmissions to the application server. The authentication factor associated with the micro-authorization can requires authentication via a supervisor that is different from the end-user.

In various examples, the plurality of actions are customizable via a user interface; and wherein the plurality of actions include at least one of: a POST, a GET, a PUT, a PATCH or a DELETE. The probing of the application server and the generating of the authentication pattern data can be performed in response to selection, via a user interface, of a learning mode.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such a advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A secondary authentication platform comprises:
   a network interface configured to facilitate communications between a client device and an application server via a network;
   at least one processor;
   a non-transitory machine-readable storage medium that stores operational instructions that, when executed by the at least one processor, cause the at least one processor to perform operations that include:
      probing, via the network interface, the application server by imitating an authentication process associated with a first authentication factor;
      generating, via a learning function and in response to the imitating the authentication process associated with the first authentication factor, authentication pattern data associated with the first authentication factor;
      monitoring data transmissions from a client device that are directed to the application server;
      determining when the authentication data matches the authentication pattern data by identifying authentication data associated with the first authentication factor in the data transmissions from the client device based on a comparison of the authentication data to the authentication pattern data;
      when the authentical data matches the authentication pattern data, blocking the authentication data associated with the first authentication factor and communicating with the client device via the network interface to authenticate a user of the client device to the secondary authentication platform via a second authentication factor; and
      when the user of the client device is authenticated to the secondary authentication platform via the second authentication factor, forwarding the authentication data to the application server to authenticate the user of the client device to the application server via the authentication process associated with the first authentication factor.

2. The secondary authentication platform of claim 1, wherein the communications between the client device and the application server are in accordance with a reverse proxy.

3. The secondary authentication platform of claim 1, wherein the secondary authentication platform is located in the network between the application server and a load balancer associated with the application server.

4. The secondary authentication platform of claim 1, wherein with secondary authentication platform is integrated with a load balancer associated with the application server.

5. The secondary authentication platform of claim 1, wherein the operations further include:
   forwarding additional data transmissions from the client device to the application server after the user of the client device is authenticated to the secondary authentication platform via the second authentication factor; and
   blocking the additional data transmissions from the client device to the application server when the user of the client device is not authenticated to the secondary authentication platform via the second authentication factor.

6. The secondary authentication platform of claim 1, wherein the operations further include:
   monitoring additional data transmissions from the client device to the application server for a plurality of actions associated with micro-authorization; and
   when the additional data transmissions from the client device to the application server include one of the plurality of actions associated with micro-authorization, communicating with the client device via the network interface to perform a further authentication via an authentication factor associated with the micro-authorization.

7. The secondary authentication platform of claim 6, wherein the operations further include:
   when the further authentication is successful, forwarding the addition data transmissions to the application server; and
   when the further authentication is unsuccessful, blocking the addition data transmissions to the application server.

8. The secondary authentication platform of claim 6, wherein the authentication factor associated with the micro-authorization requires authentication via a supervisor that is different from the user.

9. The secondary authentication platform of claim 6, further comprising:
   a user interface;
   wherein the plurality of actions are customizable via the user interface; and
   wherein the plurality of actions include at least one of: a POST, a GET, a PUT, a PATCH or a DELETE.

10. The secondary authentication platform of claim 1, further comprising:
   a user interface;
   wherein the probing of the application server and the generating of the authentication pattern data are performed in response to selection, via the user interface, of a learning mode; and wherein imitating the authentication process associated with the first authentication factor includes imitating the authentication for a dummy user.

11. A method comprises:

probing, via a network interface of a secondary authentication platform, an application server by imitating an authentication process associated with a first authentication factor;

generating, via a learning function and in response to the imitating the authentication process associated with the first authentication factor, authentication pattern data associated with the first authentication factor;

monitoring data transmissions from a client device that are directed to the application server;

determining when the authentication data matches the authentication pattern data by identifying authentication data associated with the first authentication factor in the data transmissions from the client device based on a comparison of the authentication data to the authentication pattern data;

when the authentical data matches the authentication pattern data, blocking the authentication data associated with the first authentication factor and communicating with the client device via the network interface to authenticate a user of the client device to the secondary authentication platform via a second authentication factor; and when the user of the client device is authenticated to the secondary authentication platform via the second authentication factor, forwarding the authentication data to the application server to authenticate the user of the client device to the application server via the authentication process associated with the first authentication factor.

12. The method of claim 11, wherein the communications between the client device and the application server are in accordance with a reverse proxy.

13. The method of claim 11, wherein the secondary authentication platform is located in a network between the application server and a load balancer associated with the application server.

14. The method of claim 11, wherein with secondary authentication platform is integrated with a load balancer associated with the application server.

15. The method of claim 11, further comprising:

forwarding additional data transmissions from the client device to the application server after the user of the client device is authenticated to the secondary authentication platform via the second authentication factor; and blocking the additional data transmissions from the client device to the application server when the user of the client device is not authenticated to the secondary authentication platform via the second authentication factor.

16. The method of claim 11, further comprising:

monitoring additional data transmissions from the client device to the application server for a plurality of actions associated with micro-authorization; and when the additional data transmissions from the client device to the application server include one of the plurality of actions associated with micro-authorization, communicating with the client device via the network interface to perform a further authentication via an authentication factor associated with the micro-authorization.

17. The method of claim 16, further comprising:

when the further authentication is successful, forwarding the addition data transmissions to the application server; and when the further authentication is unsuccessful, blocking the addition data transmissions to the application server.

18. The method of claim 16, wherein the authentication factor associated with the micro-authorization requires authentication via a supervisor that is different from the user.

19. The method of claim 16, wherein the plurality of actions are customizable via a user interface; and wherein the plurality of actions include at least one of: a POST, a GET, a PUT, a PATCH or a DELETE.

20. The method of claim 11, wherein the probing of the application server and the generating of the authentication pattern data are performed in response to selection, via a user interface, of a learning mode and wherein imitating the authentication process associated with the first authentication factor includes imitating the authentication for a dummy user.

* * * * *